Figure 1:
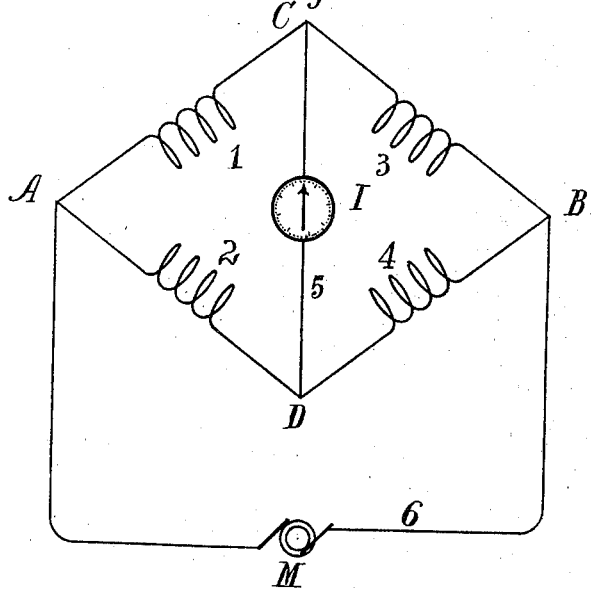

No. 625,647. Patented May 23, 1899.
A. C. CREHORE & G. O. SQUIER.
ALTERNATING CURRENT RANGE AND POSITION FINDER.
(Application filed Jan. 29, 1898.)
(No Model.) 2 Sheets—Sheet 1.

Witnesses:
C. L. Belcher
N. A. Capel

Inventors
Albert C. Crehore
George O. Squier
By
H. C. Townsend
Attorney

THE NORRIS PETERS CO., PHOTO-LITHO., WASHINGTON, D. C.

No. 625,647. Patented May 23, 1899.
A. C. CREHORE & G. O. SQUIER.
ALTERNATING CURRENT RANGE AND POSITION FINDER.
(Application filed Jan. 29, 1898.)
(No Model.) 2 Sheets—Sheet 2.

Witnesses:
C. L. Belcher
W. H. Capel.

Inventors
Albert C. Crehore
George O. Squier
By
H. C. Townsend
Attorney

THE NORRIS PETERS CO., PHOTO-LITHO., WASHINGTON, D. C.

UNITED STATES PATENT OFFICE.

ALBERT C. CREHORE, OF HANOVER, NEW HAMPSHIRE, AND GEORGE OWEN SQUIER, OF FORTRESS MONROE, VIRGINIA.

ALTERNATING-CURRENT RANGE AND POSITION FINDER.

SPECIFICATION forming part of Letters Patent No. 625,647, dated May 23, 1899.

Application filed January 29, 1898. Serial No. 668,410. (No model.)

*To all whom it may concern:*

Be it known that we, ALBERT C. CREHORE, of Hanover, in the county of Grafton and State of New Hampshire, and GEORGE OWEN SQUIER, of Fortress Monroe, in the county of Elizabeth City and State of Virginia, citizens of the United States, have invented a certain new and useful Alternating-Current Range and Position Finder, of which the following is a specification.

This invention relates to an improvement in systems and apparatus wherein the movement of an object or instrument at a distance may be ascertained and followed at a central or home station. It has particular reference to systems and apparatus employed in coast defense for ascertaining the position of an observing instrument while sighting an object at sea, and for convenience in setting forth the invention reference will be made to this application thereof. Some of these systems, as is well known, contain one or more observing instruments or telescopes located at outlying points and indicators at a central station for following the movements of the outlying instruments, which indicators may or may not be accompanied by a telescope and may or may not be accompanied by suitable plotting-boards for recording and determining the positions of the objects observed. The main difficulty in this class of devices resides in producing exact parallelism of movement between the indicator and the distant instrument.

This invention has for its main object the solution of this problem, the key to which lies in the utilization of the alternating current and the property thereof known as "reactance."

Heretofore the indicator has been made to follow the outlying observing instrument by using the direct current in a Wheatstone-bridge arrangement, in which a variation in resistance produced by the movement of a sliding contact carried by the observing instrument is supplemented by a like movement of the indicator, which also moves a sliding contact over a resistance until the galvanometer in the bridge is brought to zero, at which time the indicator is or should be in parallelism with the observing instrument. In such systems the errors are many and difficult to eliminate, and because of the sliding contacts and nicely-adjusted parts the instruments are too delicate to withstand the rough usage which they must meet in actual service. Also in these instruments, which are not constantly in use, it is difficult to keep the sliding contacts bright, the corrosion of which adds resistance. It is also difficult to obtain for the variable resistance a perfectly uniform wire whose length is exactly proportional to its electrical resistance. Then, too, the resistance between stations must be as low as possible to allow sufficient sensitiveness to the changes in resistances at the stations. A complete metallic circuit must also be used to avoid the necessity of repeatedly adjusting the balance of the bridge to compensate for the variations of earth resistance. None of these objections obtain in the system which forms the subject of this invention. In it the alternating current is used and the reactance of the circuit is utilized, since this property of the circuit is more important as a controlling factor than the resistance, and in utilizing it the ground as well as the line resistance may be neglected. By using the reactance of the circuit as the controlling and regulating factor an unbroken circuit can be used and the condition of the current varied at will by the movement of a mass or masses of iron in inductive relation to parts of the circuit, the movement of which iron may accompany or be determined by the movement of the observing instrument and the indicator, respectively.

With the above objects and ends in view the invention consists in the systems and apparatus hereinafter described, and set forth in the claims.

Figure 2:
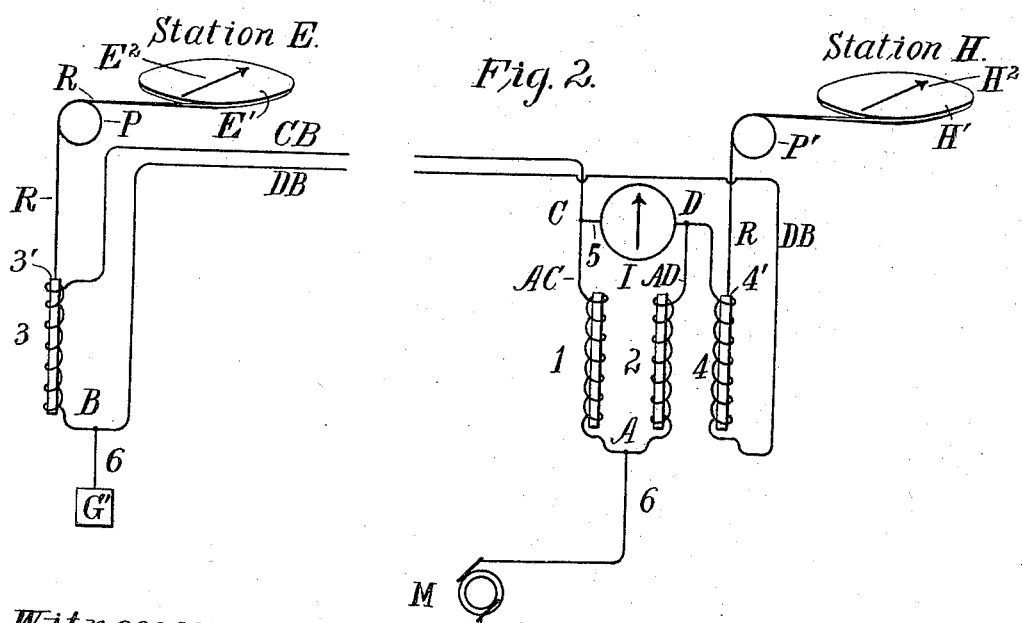
Figure 3:
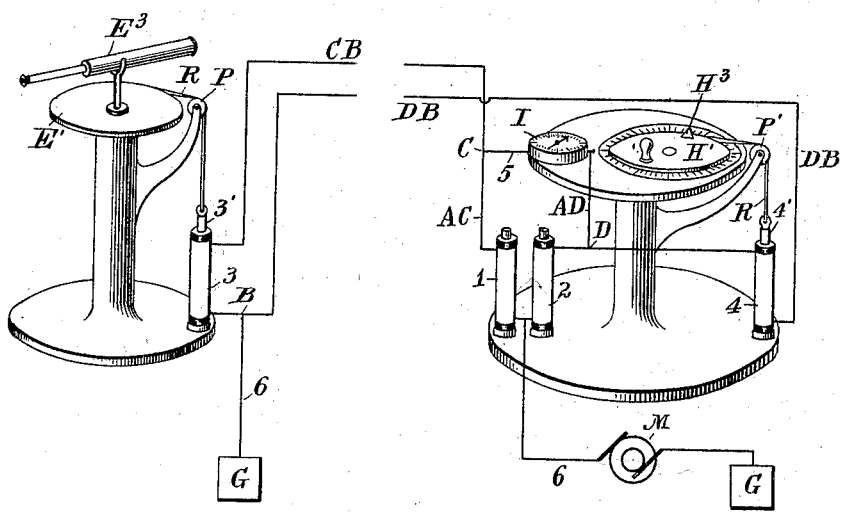
Figure 4:
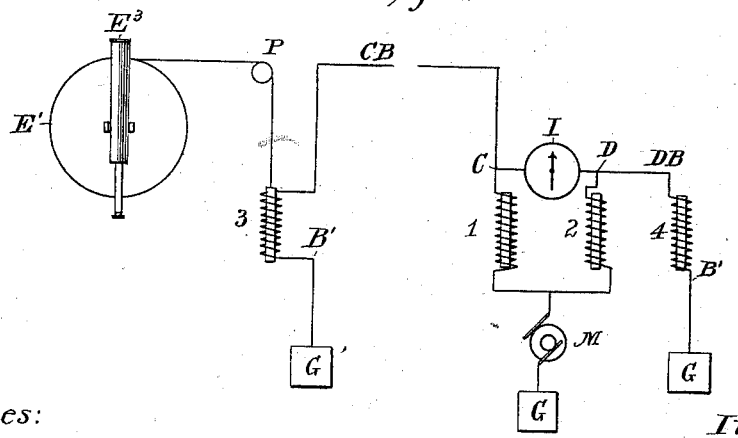

In the accompanying drawings, which form a part of this specification, Figure 1 graphically represents the relative arrangement of circuits employed in this invention, said arrangement being after the plan of the Wheatstone bridge. Fig. 2 is a diagrammatic representation of the systems and apparatus embodying the invention. Fig. 3 shows the same system with a crude representation of the instruments at the stations. Fig. 4 is a modification diagrammatically represented.

Referring to Fig. 1 for the fundamental elements of our system and apparatus, the source of electromotive force is indicated at M in the branch 6, and in the conjugate branch 5 is represented at I a mil-ammeter for detecting the presence of an alternating current. In the other branches at 1 2 3 4 are indicated coils with inductance to be constructed and operated as hereinafter set forth.

In the actual application of the elements just referred to their disposition would be as indicated in Fig. 2, wherein a part of the circuits and apparatus, including the mil-ammeter, are grouped at station H and the remainder at station E, the former being the central or home station and the latter the outlying station. Both of these may be observation-stations. The generator may be located at any suitable point and grounded, the circuit 6 leading therefrom to A, there dividing into branches A C and A D, which are bridged from C to D by the branch 5, the branch C B thence extending to B, whence it may be grounded, as indicated, or connected by circuit 6 to the generator. The branch D B is also shown as extending to B at station E; but it may be grounded at station H, thereby necessitating the running of only one line between stations. This modification is represented in Fig. 4, wherein B' B' indicate the terminals of branches C B and D B.

The inductances of the branches containing coils 1 and 2 are fixed and constant, preferably approximately equal, likewise those of the coils 3 and 4 when their cores are in the same relative positions, the latter coils being provided with movable cores, while the cores of the former remain fixed. By the movement of the core 3' the bridge becomes unbalanced, as shown by the needle at I, which balance may be regained by a like movement of the core 4'. This action of the cores is taken advantage of by connecting the former to the instrument at station E, so as to be moved thereby, and the latter to the indicator at station H, so that the latter may be moved into parallelism with the instrument at station E, this parallel condition being shown by the needle at I, coming to zero or other predetermined point of rest. These movements of the cores may be accomplished in many ways, the one used consisting in connecting said cores by wires or bands R to wheels of equal diameters mounted upon or formed upon the bases or standards of the instruments, said wheels being indicated at E' H'. These are shown as adapted to rotate in horizontal planes, and as the cores are intended to fall by gravity the bands may change direction over suitable pulleys, as P P'.

The darts $E^2$ $H^2$ at the stations are to represent, respectively, the direction of the telescope at the former and that of the indicator at the latter. In Fig. 3 the telescope $E^3$ and indicator $H^3$ are substituted for said darts.

In operation if the telescope $E^2$ be moved through a certain angle to sight an object the needle of I will move from position of rest. Then the angle through which the telescope moved may be determined at H by moving the indicator $H^2$ until the needle at I returns to position of rest. Then $H^2$ will be parallel to $E^2$, thereby indicating with relation to the working base certain data concerning the position of the object, the data being such as the particular instrument followed by the indicator is assigned to furnish. This data may relate to horizontal or vertical displacement of the instrument or to angular movement thereof in any known plane.

The instrument at I, if a galvanometer, must be one suited to indicate alternating currents of small magnitude. Such an instrument is not yet commercially available, so other means may be used—such, for instance, as a telephone or a galvanometer adapted to serve as a Siemens galvanometer. In the last the needle instead of coming to rest at zero stops at its minimum reading nearly at zero.

In the above system there are no circuit making and breaking contacts to adjust and keep clean and no delicate parts to guard. There are simply the unbroken line with its coils and cores and the cores movable within the regulating-coils. These parts will endure the usual amount of rough usage to be met with in the service without detrimentally affecting the operation of the system. It is obvious that this manner of employing the reactance of an electric current may be applied to many purposes other than that given herein as an illustration and that the manner of utilizing this characteristic of the alternating current may be greatly varied from that shown without departing from this invention. One obvious change may be effected by dispensing with the indicator $H^2$, fixing the core 4' in its coil, and calibrating the instrument I to give direct readings of the positions of the instrument $E^2$. Such a modification is seen in Fig. 4.

The invention claimed is—

1. The method of obtaining parallelism between two instruments at a distance from one another, consisting in varying the reactance of an alternating-current circuit at one point in correspondence with the position of the instrument at such point and correspondingly varying the reactance in said circuit at the other instrument to restore the balance or normal condition of the circuit.

2. The herein-described improvement in indicating at one point the position of an apparatus at another point by electrical means, consisting in employing an alternating-current circuit, connecting the points, and producing changes in the reactance of the circuit by changes in position of the apparatus in order to operate the indicating appliance at the distance-point.

3. The combination with an observing instrument at one point and an electrical indicating apparatus at another, of an alternating-current circuit connecting the two points, and means connected with the observing instrument whereby changes in the position of the same may cause changes in the reactance of the circuit for the purpose set forth.

4. The combination with a Wheatstone bridge, of an alternating-current generator supplying the circuit thereof, a movable instrument, means operated thereby for varying the reactance in one branch of the bridge, and a movable core or mass of iron in the field of another branch for affecting the reactance thereof, and actuated by an indicator to restore the reactive balance of the bridge as the indicator is brought into parallelism with said instrument.

5. The combination with a Wheatstone bridge, of an alternating-current generator supplying the circuit thereof, a movable instrument, means operated thereby for varying the reactance in one branch of the bridge, and means in another branch of the bridge affecting the reactance thereof and actuated by an indicator which is brought into parallelism with the instrument as the bridge regains its reactive balance.

Signed at Hanover, in the county of Grafton and State of New Hampshire, this 13th day of December, A. D. 1897.

ALBERT C. CREHORE.

Witnesses:
    WM. H. CAPEL,
    DELBERT H. DECKER.

Signed at Fortress Monroe, in the county of Elizabeth City and State of Virginia, this 29th day of November, A. D. 1897.

GEORGE OWEN SQUIER.

Witnesses:
    HAMIN JONES,
    SHERWOOD JONES.